(12) United States Patent
Marquet et al.

(10) Patent No.: US 8,827,682 B2
(45) Date of Patent: Sep. 9, 2014

(54) MOULD FOR A FOOD PRODUCT

(75) Inventors: Olivier Marquet, Mauron (FR);
Bernard Cadoret, Mauron (FR)

(73) Assignee: Armor Inox, Mauron (FR)

(*) Notice: Subject to any disclaimer, the term of this patent is extended or adjusted under 35 U.S.C. 154(b) by 166 days.

(21) Appl. No.: 13/237,275

(22) Filed: Sep. 20, 2011

(65) Prior Publication Data

US 2012/0076885 A1 Mar. 29, 2012

(30) Foreign Application Priority Data

Sep. 28, 2010 (FR) ...................... 10 57796

(51) Int. Cl.
*A21C 3/02* (2006.01)
*A21C 7/02* (2006.01)
*A22C 7/00* (2006.01)
*A23P 1/10* (2006.01)

(52) U.S. Cl.
CPC ............... *A22C 7/0053* (2013.01); *A23P 1/105* (2013.01)
USPC ........... 425/234; 425/338; 425/470; 426/512; 426/517

(58) Field of Classification Search
USPC .................... 425/234, 338, 346; 426/512–514
See application file for complete search history.

(56) References Cited

U.S. PATENT DOCUMENTS

| | | | | |
|---|---|---|---|---|
| 2,356,860 | A | * | 8/1944 | Lewis ............................ 425/389 |
| 2,370,925 | A | * | 3/1945 | Wade ............................. 426/515 |
| 5,499,575 | A | | 3/1996 | Handel et al. |
| 6,378,836 | B1 | * | 4/2002 | Anthony ........................ 425/470 |
| 7,118,368 | B2 | * | 10/2006 | Dreano .......................... 425/195 |
| 2005/0064081 | A1 | * | 3/2005 | Skaletski ....................... 426/582 |

FOREIGN PATENT DOCUMENTS

| | | |
|---|---|---|
| DE | 466168 | 10/1928 |
| FR | 588161 | 5/1925 |
| FR | 2758438 | 7/1998 |

OTHER PUBLICATIONS

France Search Report for 10/57796 dated Jun. 1, 2011 (non-English).

* cited by examiner

*Primary Examiner* — Thukhanh Nguyen
(74) *Attorney, Agent, or Firm* — Nixon & Vanderhye PC

(57) ABSTRACT

The invention concerns a mould for a food product, comprising at least one shell (302*a*, 302*b*) having a marking zone consisting of a plurality of ribs (402, 406) intersecting one another, said mould being characterized in that each rib (402, 406) has an edge (404, 408) having a sharp ridge oriented towards the inside of the mould in order to mark the food product during preparation thereof in said mould and in that said or each shell (302*a*, 302*b*) has, at the ends thereof, a recess (314, 414) intended to form, with the recesses (314, 414) of the other shells constituting the mould, a hollow (312, 412) that extends from the inside of the mould and in the direction of the outside of the mould.

9 Claims, 4 Drawing Sheets

MOULD FOR A FOOD PRODUCT

This application claims priority to France Patent Application No. 10/57796 filed 28 Sep. 2010, the entire contents of each of which are hereby incorporated by reference.

The present invention concerns a mould for food products as well as a moulding assembly comprising a plurality of such moulds.

In order to produce marks on food products such as hams, sausages and poultry products, it is possible, as before, to use a knife so as to produce serrations in two intersecting directions. It is also possible to put various meshes of the extensible net or string type in contact with the product. Using this last means applied against the product, serrations are produced on the surface in order also to give these products the appearance of a manufactured product as in the past and bearing the mark of a mesh. The modification thus made to the appearance of the product gives the consumer the image of a quality product.

Moulds are also known for producing marks on the surface of food products. These moulds have walls consisting of cylindrical or flat ligaments intersecting so as to form between them a design.

The marks obtained on the surface of the food product by means of such moulds take the form of relatively wide grooves with a cylindrical or flat profile and therefore differ from those that could be found on products of old.

The drawback of such moulds is therefore that they do not make it possible to produce marks giving the required appearance to the product.

In addition, the ligaments are generally welded at the crossings. The welds generally have burrs that risk becoming attached to the packaging of the food product and tearing it.

One object of the present invention is to propose a mould for food products that does not have the drawbacks of the prior art and in particular makes it possible to produce marks having the required appearance on food products such as hams during manufacture thereof.

For this purpose, a mould is proposed for a food product characterised in that it comprises at least one shell having a marking zone consisting of a plurality of ribs intersecting one another, each rib having an edge having a sharp ridge oriented towards the inside of the mould in order to mark the food product during preparation thereof in said mould.

Advantageously, two sharp ridges that intersect form a clear marking of the intersection on said food product during marking thereof.

Advantageously, the or each shell is produced by moulding from a plastics material.

Advantageously, the or each shell consists of a plurality of axial ribs disposed alongside one another perpendicular to the longitudinal axis of said mould and a plurality of longitudinal ribs extending between the two ends of the mould perpendicular to the axial ribs and secured to said axial ribs.

Advantageously, said or each shell has, at the ends thereof, a recess intended to form, with the recesses on the other shells constituting the mould, a hollow that extends from the inside of the mould and in the direction of the outside of the mould.

Advantageously, the hollow is blind at the level of the outside of the mould.

The invention also proposes a moulding assembly comprising:
   a frame for stacking of said moulding assembly with an identical moulding assembly,
   at least one lower half-mould fixed to said frame, open towards the top and intended to form the lower part of a food product,
   at least one upper half-mould fixed to said frame open towards the bottom and intended to form the upper part of a food product,
   each upper half-mould being disposed under one of the lower half-moulds so that, when said two moulding assemblies are stacked, each upper half-mould of said upper moulding assembly covers a lower half-mould of the lower moulding assembly,
said moulding assembly being characterised in that each upper half-mould and each lower half-mould thus associated constitute a mould according to one of the above variants.

Advantageously, the moulding assembly comprises fixing means that are intended to fix each half-mould to the frame and are removable.

Advantageously, the fixing means consist of at least two fixing rods passing firstly right through the frame and secondly through at least two fixing plates that each half-mould has, and locking means intended to lock each fixing rod in translation with respect to said frame.

Advantageously, each fixing plate constitutes one of the ribs of said moult.

The features of the invention mentioned above, as well as others, will emerge more clearly from a reading of the following description of an example embodiment, said description being given in relation to the accompanying drawings, among which:

Figure 1:
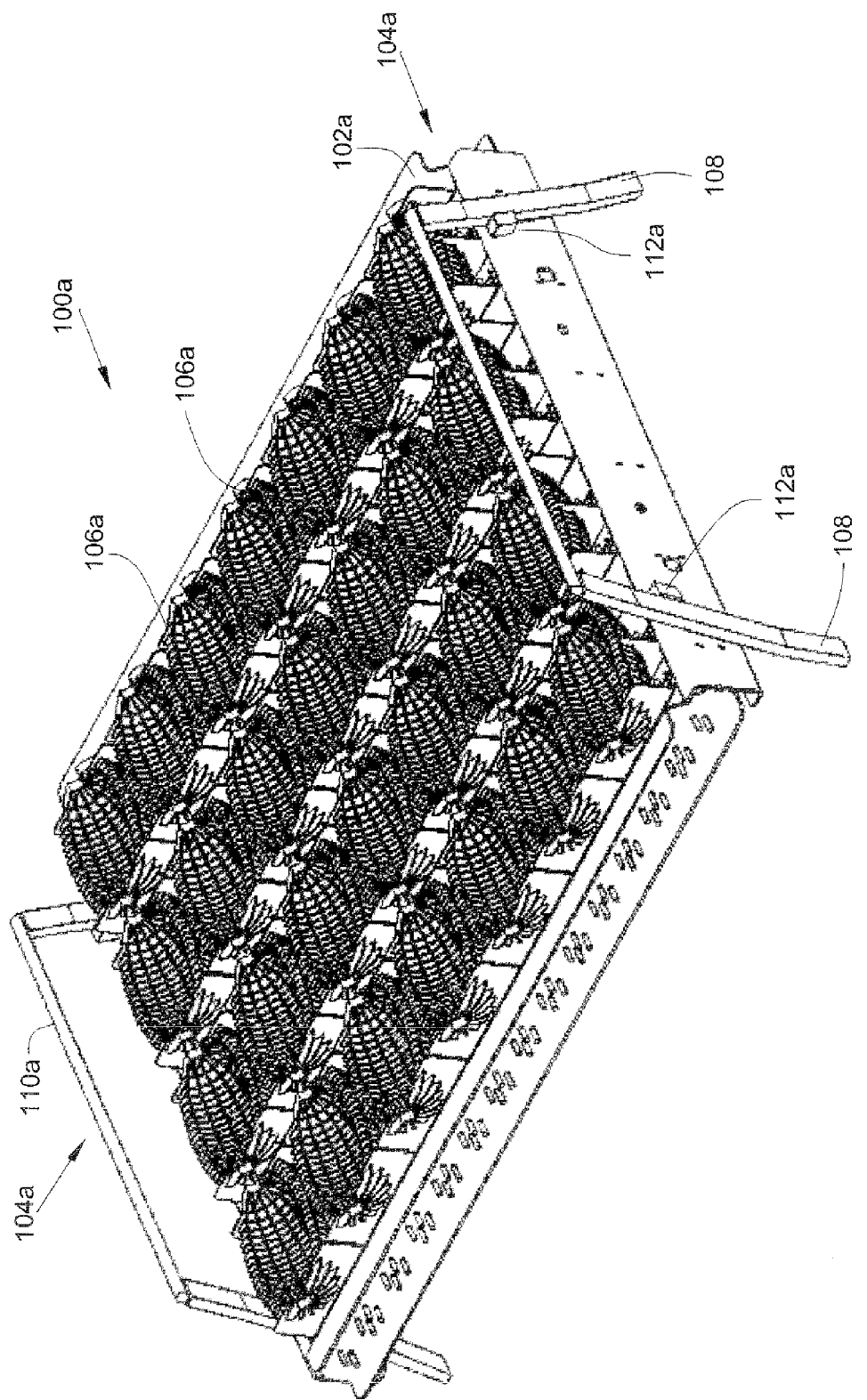
FIG. 1 shows a moulding assembly according to the invention.

In the following description, the terms relating to a position are taken with reference to a moulding assembly resting on the floor, as shown in FIG. 1.

FIG. 1 shows a moulding assembly 100a that comprises a frame 102a to which two crossbar and leg assemblies 104a are fixed.

Each crossbar and leg assembly 104a comprises two legs 108 and a support bar 110a fixed between the top ends of the two legs 108. A stop 112a is fixed to each leg 108. The two stops 112a of each crossbar leg assembly 104a face each other. The two legs 108 on the same crossbar and leg assembly 104a are disposed obliquely, that is to say the bottom ends of two legs 108 are further apart than their top ends. Each crossbar and leg assembly 104a thus takes overall the form of a trapezium.

The moulding assembly 100a comprises a plurality of lower half-moulds 106a that are fixed to the frame 102a. Each lower half-mould 106a is open towards the top and is intended to form the lower part of a food product.

In the embodiment of the invention presented in FIG. 1, each lower half-mould 106a takes the form of a semi-ovoid, but it is also possible to provide for each lower half-mould 106a to take another form such as for example a channel taking the form of a half cylinder and which extends over the width of the frame 102a.

Figure 2:
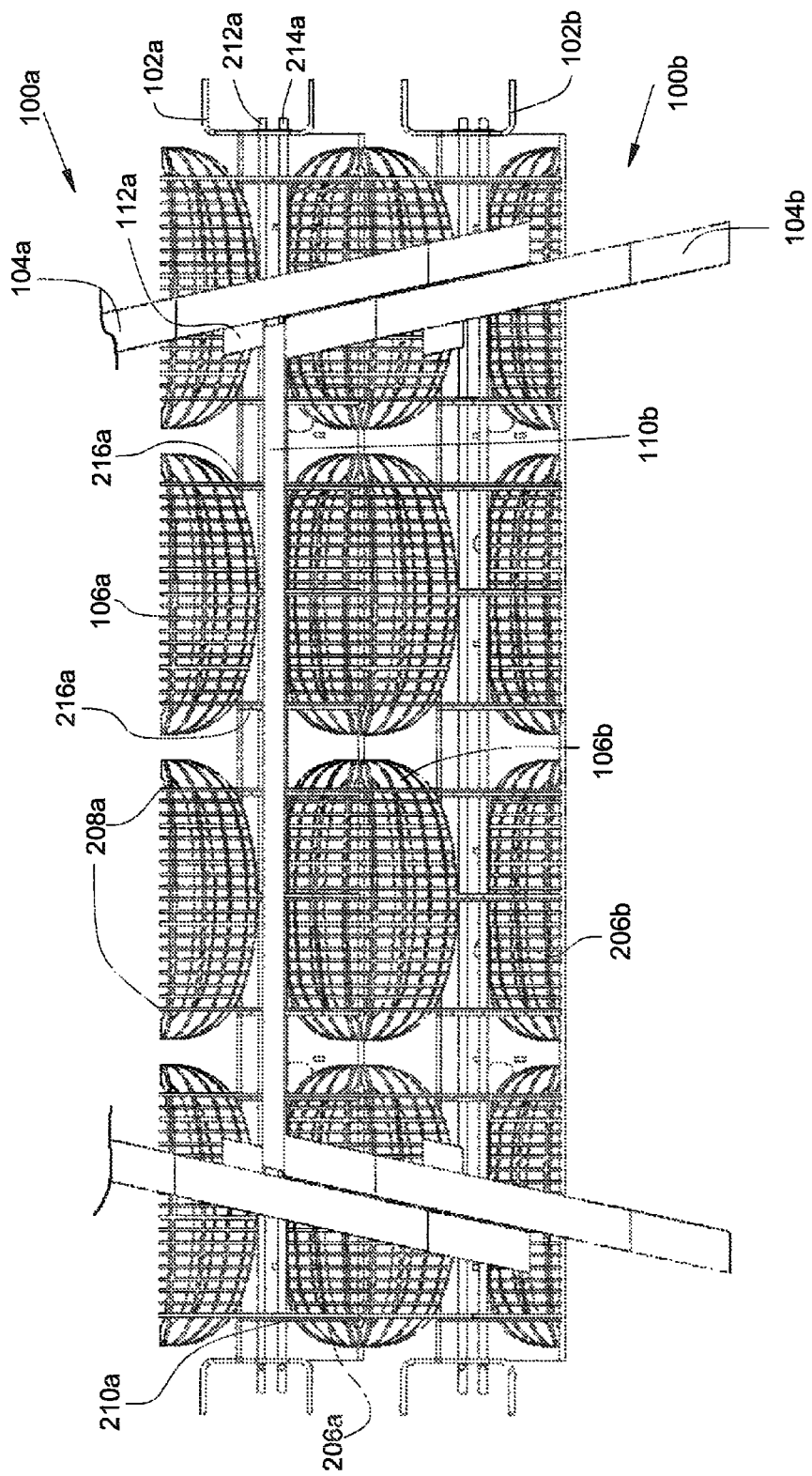
FIG. 2 shows a stack of two moulding assemblies of FIG. 1.

FIG. 2 shows a stacking of the moulding assembly 100a of FIG. 1 with an identical moulding assembly 100b.

The two moulding assemblies 100a and 100b are identical and the different elements making them up bear the same references indexed by the letter "a" or the letter "b", depending on whether the element in question belongs to the upper moulding assembly 100a or the lower moulding assembly 100b.

For each moulding assembly 100a, 100b, a part of the frame 102a, 102b has been removed in order to make it possible to see the inside of said moulding assembly 100a, 100b.

The crossbar and leg assemblies 104a and 104b are designed to make it possible to stack a plurality of identical moulding assemblies 100a and 100b. Naturally, the form of the crossbar and leg assemblies 104a and 104b may be different so long as it affords load transfer over the height of the stack as far as the floor through the crossbar and leg assemblies 104a and 104b when the units are in abutment one on top of the other.

Here the stops 112a of the upper moulding assembly 100a rest on the support bar 110b of the lower moulding assembly 100b.

Each moulding assembly 100a, 100b also comprises, for each lower half-mould 106a, 106b, an upper half-mould 206a, 206b fixed to the frame 102a, 102b of the corresponding moulding assembly 100a, 100b.

Each upper half-mould 206a is open downwards and makes it possible to form the upper part of a food product.

Each upper half-mould 206a is disposed on one of the lower-half moulds 106a so that, when the moulding assembly 100a is stacked on the other identical moulding assembly 100b, each upper half-mould 206a of said upper moulding assembly 100a covers a lower half-mould 106b of the lower moulding assembly 100b.

Each lower half-mould 106b of the lower moulding assembly 100b and each upper half-mould 206a of the upper moulding assembly 100a form together a mould in which the food product is conformed and serrated during preparation thereof, which consists of a cooking phase and a cooling phase.

To facilitate the changing of the half-moulds 106a and 206a of the moulding assembly 100a, each of them is fixed to the frame 102a using removable fixing means. Changes of the half-moulds 106a and 206a may be occasioned by the fitting of half-moulds of different shapes, by the replacement of a broken or worn half-mould, etc.

In the embodiment of the invention presented in the figures, each half-mould 106a and respectively 206a has at least two fixing plates 208a and respectively 210a that have at least two fixing rods 212a and respectively 214a passing through them.

Each fixing rod 212a, 214a passes right through the frame 102a and is held in holes produced in the walls forming the frame 102a and provided for this purpose.

Each fixing rod 212a, 214a is then locked in translation with respect to the chassis 102a using suitable removable locking means, such as for example nuts, pins, etc.

The fixing rods 212a, 214a and the locking means constitute the removable fixing means.

The mounting of the lower half-moulds 106a consists of sliding the fixing rods 212a, from one end of the frame 102a to the other while successively fitting the various lower half-moulds 106a until they pass through the frame 102a, and then putting the locking means in place.

In order to ensure that a lower half-mould 106b of the lower moulding assembly 100b is situated opposite an upper half-mould 206a of the upper moulding assembly 100a and that they do not move, the positioning of the half-moulds 106b and 206a is positively located.

When the half-mould 106a, 206a takes the form of a spout that extends over the width of the frame 102a, the positioning and positive location of each half-mould 106a, 206a can be achieved by applying a fixing plate 208a, 210a against each wall of the frame 102a delimiting the width thereof.

When there are several half-moulds 106a, 206a on the width of the frame 102a, the positioning and positive location of each of them is ensured for example by at least two connecting sheets 216a secured to the frame 102a and on each of which a fixing plate 208a, 210a comes into abutment, on one side of the connecting sheet 216a in one case and on the other side of the other connecting sheet 216a in the other case.

The connecting sheets 216a also make it possible to stiffen the frame 102a in order to avoid deformations.

Figure 3:
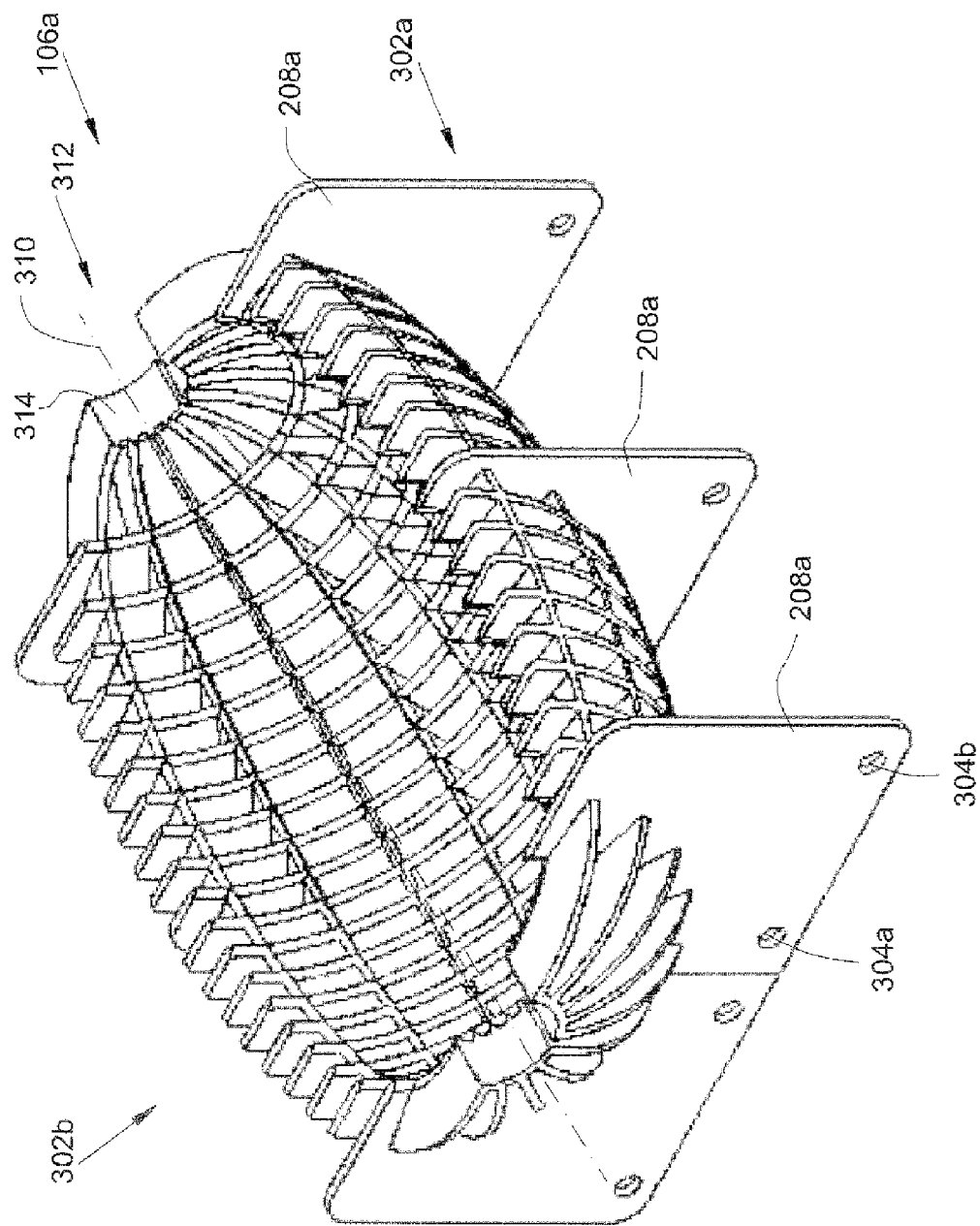
FIG. 3 shows a half-mould of a mould according to the invention.

FIG. 3 shows a lower half-mould 106a but the following description applies in the same way for an upper half-mould.

The half-mould 106a is produced by moulding from a plastics material that is suitable for being used in the context of food industries, such as for example high-density polyethylene (HDPE).

For ease of manufacture, the half-mould 106a is produced in two shells 302a and 302b, which are here identical and symmetrical with respect to a vertical plane passing through the longitudinal axis of the mould 310, which is here the longitudinal axis of the ovoid.

Naturally it is possible to provide for each half-mould 106a to be composed of a single shell.

Figure 4:
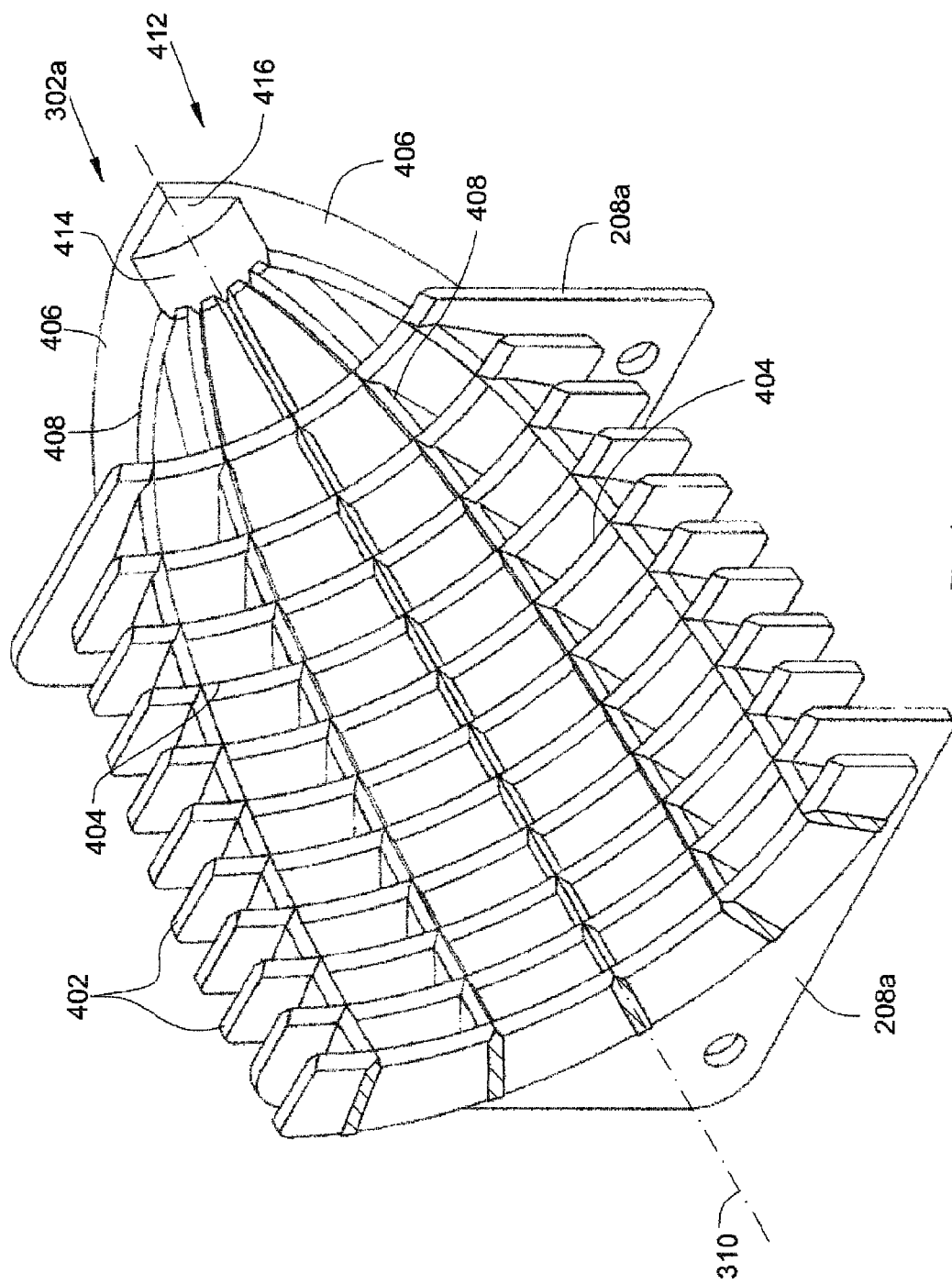
FIG. 4 is an enlargement of a detail of FIG. 3.

FIG. 4 shows an enlargement of part of the shell 302a of FIG. 3.

In the embodiment of the invention presented here, the grid covers the entire surface of the food product, but it is possible that the food product should be marked only on part of its surface, only the shell or shells that are opposite this part then having a grid. Thus, in general terms, the mould comprises at least one shell 302a, 302b that has a marking zone consisting of a plurality of ribs 402 and 406 that intersect each other. Each rib 402, 406 has an edge 404, 408 that has a sharp ridge and is oriented towards the inside of the mould in order to mark the food product when it is prepared in said mould.

Each shell 302a, 302b here has three fixing plates 208a, which each has two holes 304a and 304b in it, each being intended to enable a fixing rod 212a to pass.

The shell 302a thus consists of a plurality of axial ribs 402 that are disposed alongside one another perpendicular to the longitudinal axis 310.

In the embodiment of the invention presented in the figures, each fixing plate 208a constitutes one of the axial ribs 402.

Each axial rib 402 has an edge 404 that is conformed so as to define the form that the moulded food product will take after preparation thereof.

In the embodiment of the invention presented in the figures, each edge 404 takes substantially the form of an arc of a circle, the radius of which increases from the ends towards the middle of the shell 302a.

In order to hold the axial ribs 402, the shell 302a also has a plurality of longitudinal ribs 406 that extend between the two ends of the mould, that is to say here of the ovoid, in planes perpendicular to the axial ribs 402 and which, in the embodiment of the invention shown in FIG. 4, contain the longitudinal axis 310.

In the same way as the axial ribs 402, each longitudinal rib 406 has an edge 408 that is conformed so as to define the form that the moulded food product will take after preparation thereof. In the present embodiment, the longitudinal ribs 406 converge as a net would do in the direction of the end of the food product.

Each shell 302a thus has a grid consisting of the edges 404 of the axial ribs 402 and the edges 408 of the longitudinal ribs 406 and which marks the food product during preparation thereof.

In the embodiment of the invention presented here, for each shell 302a, there are 19 axial ribs 402 distant from one another by 15 mm and 5 longitudinal ribs 406 separated radially from one another by 18°.

In order to ensure good marking of the food product, that is to say fine regular serrations, each edge 404, 408 has a sharp ridge, that is to say having a radius of curvature that is as small as possible.

The sharp ridge issues from a bevelled wedge produced at the edge 404, 408 in question.

The marks produced on the food products are then sharp and there are no burrs that may tear the packaging of the food products.

When the sharp ridges of the two edges 404 and 408 intersect, they form a sharp intersection at the intersection of said two edges 404 and 408, contrary to what happens in the prior art, where the intersection of two ligaments marks the food product over a spread-out surface. Thus two sharp ridges that intersect form a sharp marking of the intersection on said food product during marking thereof.

The food product placed in the mould is generally placed in a casing, each end of which is closed by a closure means, which is also referred to as a clip. In order to prevent this closure means interfering with the extension of the food product and the mark, each end of the mould thus has a hollow 312, 412 that extends from the inside of the mould and in the direction of the outside of the mould in a direction parallel to the longitudinal axis 310 and in which the closure means can be housed.

In the embodiment of the invention presented in FIG. 3, each hollow takes the form of a hole 312 emerging between the inside and outside of the mould by means of which the closure means can be removed from the mould, but, in the embodiment in FIG. 4, each hollow takes the font of a blind hole 412. The latter embodiment, in the case of an excessively high pressure in the mould when the food product is prepared, prevents meat enclosed in its casing from emerging through the hollow 412.

In the embodiment in FIG. 3, each shell 302a, 302b has a recess 314 intended for form the through hole 312 with the recesses 314 of the other shells forming the mould. Each recess 314 here takes the form of a quarter of a cylinder.

In the embodiment in FIG. 4, each shell 302a, 302b has a recess 414 intended to form the blind hole 412 with the recesses 414 of the other shells forming the mould. Each recess 414 here takes the form of a quarter of a cylinder with a bottom wall 416 extending in the vicinity of the outside of the mould perpendicular to the longitudinal axis 310 of the mould. When the mould is reconstituted, the bottom walls 416 of the shells 302a and 302b close the blind hole 412.

In the embodiment of the invention presented here, the reconstituted bottom of the blind hole 412 is flat, but it is possible to provide for it to take the form of a hemispherical wall.

Naturally the present invention is not limited to the examples and embodiments described and depicted but is capable of numerous variants accessible to persons skilled in the art.

For example, in the embodiment of the invention presented above, the serrations form a regular grid formed by substantially straight lines, but it is possible to provide for the lines to form curves by modifying the path followed by the sharp ridges, that is to say the form of the ribs 402 and 406.

In the invention presented here, the preparation of the food product is described as consisting, among other things, of a phase of cooking in water, but it may consist of a phase of passing through a gaseous element, of the smoking or steaming type.

For example, it is possible to replace the half-moulds with channels and pressing lids in order to produce slabs of ham.

It is also possible to implement this invention in the context of moulding assemblies for making complete pieces of ham using pressing moulds composed of an upper part and/or a lower part providing pressing of the whole of the surface of the piece of ham.

The moulding assemblies may or may not comprise a crossbar and leg assembly, which may then be parallel or perpendicular to the longitudinal direction defined by the axis of the food products.

The moulding assemblies use or not a pedestal under the moulding assembly situated at the bottom of the stack.

It is also possible to provide for the mould part to be removable or not.

It is also possible to provide for the fitting or not of a compensation system making it possible to mould, by pressing them individually, products the initial weight of which is variable.

The invention claimed is:

1. A mould for a food product placed in a casing, each end of which is closed by a closure means, said mould comprising at least one shell (302a, 302b) having a marking zone consisting of a plurality of ribs (402, 406) intersecting one another, each rib (402, 406) having an edge (404, 408) having a sharp ridge oriented towards the inside of the mould in order to mark the food product during preparation thereof in said mould and in that said or each shell (302a, 302b) has, at the ends thereof, a recess (314, 414) intended to form, with the recesses (314, 414) of the other shells constituting the mould, a hollow (312, 412) that extends from the inside of the mould and in the direction of the outside of the mould and in which the closure means can be housed.

2. The mould of claim 1, wherein two sharp ridges that intersect form a clear marking of the intersection on said food product during marking thereof.

3. The mould of claim 1, wherein the or each shell (302a, 302b) is produced by moulding from a plastics material.

4. The mould of claim 1, wherein said or each shell (302a, 302b) consists of a plurality of axial ribs (402) disposed alongside each other perpendicular to the longitudinal axis (310) of said mould and a plurality of longitudinal ribs (406) extending between the two ends of the mould perpendicular to the axial ribs (402) and secured to said axial ribs (402).

5. The mould of claim 1, wherein the hollow (412) is blind at the outside of the mould.

6. A moulding assembly (100a) comprising
- a frame (102a) for stacking said moulding assembly (100a) with an identical moulding assembly (100b),
- at least one lower half-mould (106a) fixed to said frame (102a), open towards the top and intended to form the lower part of a food product,
- at least one upper half-mould (206a) fixed to said frame (102a) open towards the bottom and intended to form the upper part of a food product,
- each upper half-mould (206a) being disposed under one of the lower half-moulds (106a) so that, when said two moulding assemblies (100a, 100b) are stacked, each upper half-mould (206a) of said upper moulding assembly (100a) covers a lower half-mould (106b) of the lower moulding assembly (100b),
- said moulding assembly (100a) being characterised in that each upper half-mould (206a) and each lower half-mould (106b) thus associated constitute a mould according to claim 1.

7. The moulding assembly (100a) of claim 6, further comprising fixing means that are intended to fix each half-mould (106a, 206a) on the frame (102a) and are removable.

8. The moulding assembly (100*a*) of claim 7, wherein the fixing means consist of at least two fixing rods (212*a*, 214*a*) passing firstly right through the frame (102*a*) and secondly through at least two fixing plates (208*a*, 210*a*) that each half-mould (106*a*, 206*a*) has, and locking means intended to lock each fixing rod (212*a*, 214*a*) in translation with respect to said chassis (102*a*).

9. The moulding assembly (100*a*) of claim 8, wherein each fixing plate (208*a*, 210*a*) constitutes one of the ribs (402, 406) of said mould.

* * * * *